United States Patent
Liu et al.

(10) Patent No.: US 9,887,547 B2
(45) Date of Patent: Feb. 6, 2018

(54) METHOD AND APPARATUS FOR DECOUPLING THE POWER OF GRID-CONNECTED INVERTER

(71) Applicants: Delta Electronics (Shanghai) Co.,Ltd., Shanghai (CN); Xi'an Jiaotong University, Shaanxi (CN)

(72) Inventors: Jinjun Liu, Shaanxi (CN); Baojin Liu, Shaanxi (CN); Zeng Liu, Shaanxi (CN); Teng Wu, Shaanxi (CN); Shike Wang, Shaanxi (CN)

(73) Assignees: DELTA ELECTRONICS (SHANGHAI) CO.,LTD., Shanghai (CN); XI'AN JIAOTONG UNIVERSITY, Shaanxi (CN)

( * ) Notice: Subject to any disclaimer, the term of this patent is extended or adjusted under 35 U.S.C. 154(b) by 0 days.

(21) Appl. No.: 15/360,983

(22) Filed: Nov. 23, 2016

(65) Prior Publication Data
US 2017/0155247 A1 Jun. 1, 2017

(30) Foreign Application Priority Data
Nov. 27, 2015 (CN) .......................... 2015 1 0851797
Oct. 26, 2016 (CN) .......................... 2016 1 0946590

(51) Int. Cl.
*H02M 1/12* (2006.01)
*H02M 1/14* (2006.01)
(Continued)

(52) U.S. Cl.
CPC ............... *H02J 3/18* (2013.01); *H02M 7/537* (2013.01)

(58) Field of Classification Search
CPC .......................... H02M 7/53873; H02M 7/5395
(Continued)

(56) References Cited

U.S. PATENT DOCUMENTS

2005/0046380 A1\* 3/2005 Matsuo ............. H02M 7/53873
318/801
2010/0127656 A1\* 5/2010 Ohtani .................... H02P 21/06
318/811
(Continued)

FOREIGN PATENT DOCUMENTS

WO 2014/203116 A1 12/2014

OTHER PUBLICATIONS

Mohammad Reza Ebrahimi et al, "A Novel Approach to Control the Frequency and Voltage of Microgrids in Islanding Operation", IACSIT International Journal of Engineering and Technology, vol. 4, No. 5, Oct. 2012, pp. 562-566.

*Primary Examiner* — Gary Nash
(74) *Attorney, Agent, or Firm* — CKC & Partners Co., Ltd.

(57) ABSTRACT

A method and an apparatus for decoupling output power of an inverter are provided. The method comprises: obtaining voltage amplitude instruction E* and voltage phase instruction θ* according to an output voltage and an output current of the inverter; obtaining an amplitude feedforward amount $E_{ff}$ and a phase feedforward amount $\delta_{ff}$ according to an amplitude U of a grid voltage of the power grid, an amplitude E of the output voltage of the inverter, and a phase difference δ between the output voltage of the inverter$_{[0]}$ and the grid voltage; obtaining a reference voltage amplitude $E_{ref}$ according to the voltage amplitude instruction E* and the amplitude feedforward amount $E_{ff}$, and obtaining a reference voltage phase $\theta_{ref}$ according to the voltage phase instruction θ* and the phase feedforward amount $\delta_{ff}$; and regulating the output power of the inverter using the reference voltage amplitude $E_{ref}$ and the reference voltage phase $\theta_{ref}$.

16 Claims, 8 Drawing Sheets

(51) Int. Cl.
*H02M 5/42* (2006.01)
*H02M 7/68* (2006.01)
*H02M 3/24* (2006.01)
*H02M 7/44* (2006.01)
*H02J 3/18* (2006.01)
*H02M 7/537* (2006.01)

(58) Field of Classification Search
USPC ... 363/35–37, 40, 41, 43, 78, 79, 95, 97, 98
See application file for complete search history.

(56) References Cited

U.S. PATENT DOCUMENTS

2013/0063059 A1* 3/2013 Chi .................. H02P 27/08
318/400.13
2013/0241292 A1* 9/2013 Kimura .............. H02J 9/00
307/66

* cited by examiner

METHOD AND APPARATUS FOR DECOUPLING THE POWER OF GRID-CONNECTED INVERTER

CROSS-REFERENCE TO RELATED APPLICATIONS

This non-provisional application claims priorities under 35 U.S.C. §119(a) on Patent Application No. 201510851797.0 filed in P.R. China on Nov. 27, 2015 and No. 201610946590.6 filed in P.R. China on Oct. 26, 2016, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE DISCLOSURE

The present invention belongs to the technical field for controlling the grid-connected inverters, and particularly relates to a method and apparatus for decoupling the output power of a grid-connected inverter.

DISCUSSION OF THE RELATED ART

With the growing of the environmental and energy crises, more and more attention has been paid to renewable energy power generation which has been applied in more and more fields. Grid-connected inverters are interface equipments indispensable for electrical energy transportation from renewable power generation systems to power grids. The performance of grid-connected inverters will impose great influences on the stability of power generation systems and power grids. Output power fluctuations generated from grid-connected inverters will decrease the utilization efficiency of the energy, and major fluctuations may cause a shock, or even a safety danger of power grids.

Depending on different control methods, grid-connected inverters are classified into two categories: current-controlled type and voltage-controlled type. Most of traditional grid-connected inverters operate in a current-controlled mode, because this control mode has advantages of having a simple structure, and being easy to implement a maximum power point tracking (MPPT) algorithm, etc. However, the current-controlled grid-connected inverters cannot operate in an island mode. In recent years, with the promotion and application of new technologies such as distributed generation and micro-grids, grid-connected inverters should be able to operate in island mode. Hence the inverters can operate independently when large power grids are unavailable, ensuring that the power supply to the important local loads is not influenced. In this context, voltage-controlled grid-connected inverters which can be operated in an island mode have been widely applied. In addition, voltage-controlled grid-connected inverters are also advantageous in that it can be smoothly transited between the island mode and the grid connection mode, can provide voltage support for a weak grid, and can be independent of phase-locked loops, etc. Therefore, they are expected to have a wide application.

Referring to FIG. 1, FIG. 1 illustrates a block diagram of a voltage-controlled grid-connected inverter in the prior art. As shown in FIG. 1, the output voltage v, output current i and inductor current $i_L$ at the inverter side of the inverter are acquired. Here, the output voltage v and the output current i are used for computing the active power and the reactive power of the inverter, and further obtaining the amplitude and phase reference values of the output voltage of the inverter through a power control algorithm. Further, the inductor current $i_L$ and the output voltage v, which are the feedback signals of a current and voltage regulator, is used to adjust the reference values. The adjusted signals are supplied to a PWM modulator (pulse width modulator), thereby controlling the output power of the inverter.

However, in the prior art both current-controlled and voltage-controlled grid-connected inverters have a problem about the coupling of output power. That is, the active power and reactive power cannot be controlled independently, and maybe affected by each other. As for the current-controlled type, many scholars have proposed decoupling methods, such as inductor current feedforward methods, vector PI controllers and so on. However, these methods cannot be directly applied to voltage-controlled grid-connected inverters because of the difference in the control mechanisms.

In addition, some scholars has proposed methods, such as virtual impedance and virtual power, for solving power coupling problems caused by the line transmission impedance which is not purely inductive. It can be considered that the active power and the reactive power of the inverter are decoupled based on the small signal models with these methods. However, these methods cannot solve large-signal coupling problems which are caused by the inherent topology of circuits. Therefore, when the reference values for one of the active power and the reactive power changes, the other one of the active power and the reactive power will fluctuate due to the coupling. This problem has not received enough attention, so there is a lack of effective decoupling methods.

SUMMARY

In order to overcome the above-mentioned problems existing in the prior art, an aspect of the present invention is to provide a method for decoupling the power of a voltage-controlled grid-connected inverter, thereby achieving independent control of the active power and reactive power outputted from the inverter.

The present invention is carried out by the following technical solution:

a method for controlling an output power of an inverter, the inverter being electrically connected to a power grid, wherein the control method comprises the following steps:

obtaining an amplitude feedforward amount $E_{ff}$ and a phase feedforward amount $\delta_{ff}$ according to a grid voltage of the power grid, an output voltage of the inverter, and a phase difference $\delta$ between the output voltage of the inverter$_{[0]}$ and the grid voltage, using the following Equation:

$$E_{ff} = \sum \frac{UE \sin \delta}{U \cos \delta - 2E} \Delta \delta$$

-continued $$\delta_{ff} = -\sum \frac{\tan\delta}{E}\Delta E,$$

wherein U is an amplitude of the grid voltage, E is an amplitude of the output voltage of the inverter, ΔE is a variation of the amplitude E of the output voltage of the inverter during two adjacent control periods, Δδ is a variation of the phase difference δ during two adjacent control periods; and controlling the output power of the inverter according to the amplitude feedforward amount $E_{ff}$ and the phase feedforward amount $\delta_{ff}$.

The present invention further provides an apparatus for controlling an output power of an inverter, the inverter being electrically connected to a power grid, wherein the apparatus comprises a feedforward amount acquisition module, configured to obtain an amplitude feedforward amount $E_{ff}$ and a phase feedforward amount $\delta_{ff}$ according to a grid voltage of the power grid, an output voltage of the inverter, and a phase difference δ between the output voltage of the inverter[o] and the grid voltage, using the following Equation:

$$E_{ff} = \sum \frac{UE\sin\delta}{U\cos\delta - 2E}\Delta\delta$$

$$\delta_{ff} = -\sum \frac{\tan\delta}{E}\Delta E,$$

wherein U is an amplitude of the grid voltage, E is an amplitude of the output voltage of the inverter, ΔE is a variation of the amplitude E of the output voltage of the inverter during two adjacent control periods, and Δδ is a variation of the phase difference δ during two adjacent control periods; and a power regulation module, configured to control the output power of the inverter according to the amplitude feedforward amount $E_{ff}$ and the phase feedforward amount $\delta_{ff}$.

Further, the present invention also provides a method for decoupling an output power of an inverter, the inverter being electrically connected to a power grid, wherein the method comprises the following steps:

step 1: obtaining a voltage amplitude instruction E* and a voltage phase instruction θ* according to an output voltage and an output current of the inverter;

step 2: obtaining an amplitude feedforward amount $E_{ff}$ and a phase feedforward amount $\delta_{ff}$ according to an amplitude U of a grid voltage of the power grid, an amplitude E of the output voltage of the inverter, and a phase difference δ between the output voltage of the inverter[o] and the grid voltage;

step 3: obtaining a reference voltage amplitude $E_{ref}$ according to the voltage amplitude instruction E* and the amplitude feedforward amount $E_{ff}$, and obtaining a reference voltage phase $\theta_{ref}$ according to the voltage phase instruction θ* and the phase feedforward amount $\delta_{ff}$; and step 4: regulating the output power of the inverter using the reference voltage amplitude $E_{ref}$ and the reference voltage phase $\theta_{ref}$.

In addition, the present invention further provides an apparatus for decoupling a power of an inverter, the inverter being electrically connected to a power grid, wherein the apparatus comprises:

a preprocessing module, configured to obtain a voltage amplitude instruction E* and a voltage phase instruction θ* according to an output voltage and an output current of the inverter;

a feedforward amount acquisition module, configured to obtain an amplitude feedforward amount $E_{ff}$ and a phase feedforward amount $\delta_{ff}$ according to an amplitude U of the grid voltage, an amplitude E of the output voltage of the inverter, and a phase difference δ between the output voltage of the inverter[o] and the grid voltage;

a reference voltage generator, configured to obtain a reference voltage amplitude $E_{ref}$ according to the voltage amplitude instruction E* and the amplitude feedforward amount $E_{ff}$, and to obtain a reference voltage phase $\theta_{ref}$ according to the voltage phase instruction θ* and the phase feedforward amount $\delta_{ff}$; and a power regulator, configured to control the output power of the inverter using the reference voltage amplitude $E_{ref}$ and the reference voltage phase $\theta_{ref}$.

This solution accurately computes the coupling amount in real time according to the relationship between active power and reactive power outputted from an inverter, and then decouples the output power according to an amplitude feedforward amount and a phase feedforward amount, respectively, so as to achieve independent control of active power and reactive power outputted from the inverter. It can be applied simply and is easy to upgrade the existing inverters to achieve good decoupling effects so that the power outputted from the inverters is stable and precise, thereby providing a good solution for engineering applications.

DETAILED DESCRIPTION OF THE PREFERRED EMBODIMENT

A preferred embodiment is provided herein to further describe the detailed contents and technical description of the present invention, but should not be construed as limiting the implementation of the present invention.

Figure 9A:
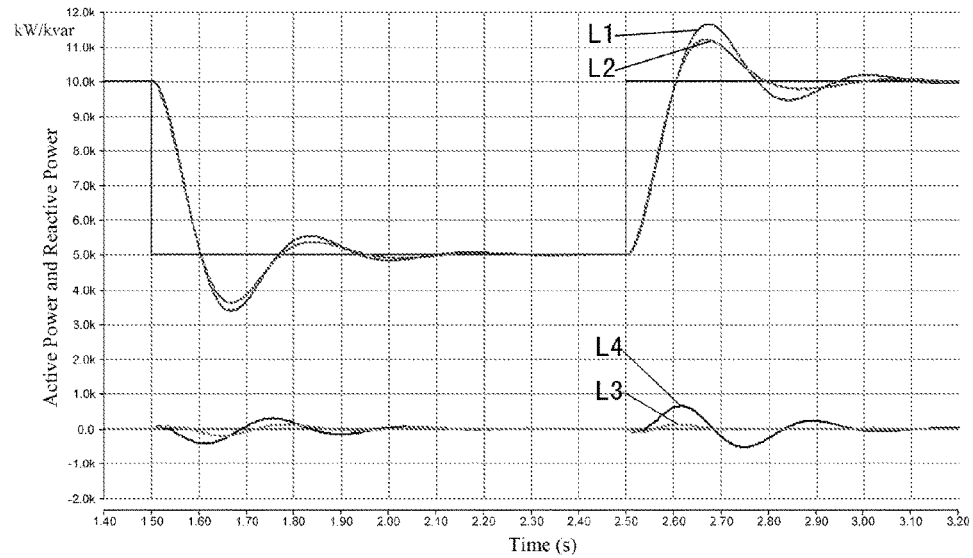
FIG. 9A shows a simulation waveform of the output reactive power when the instruction for the active power of the inverter changes according to one embodiment of the present invention.
Figure 9B:
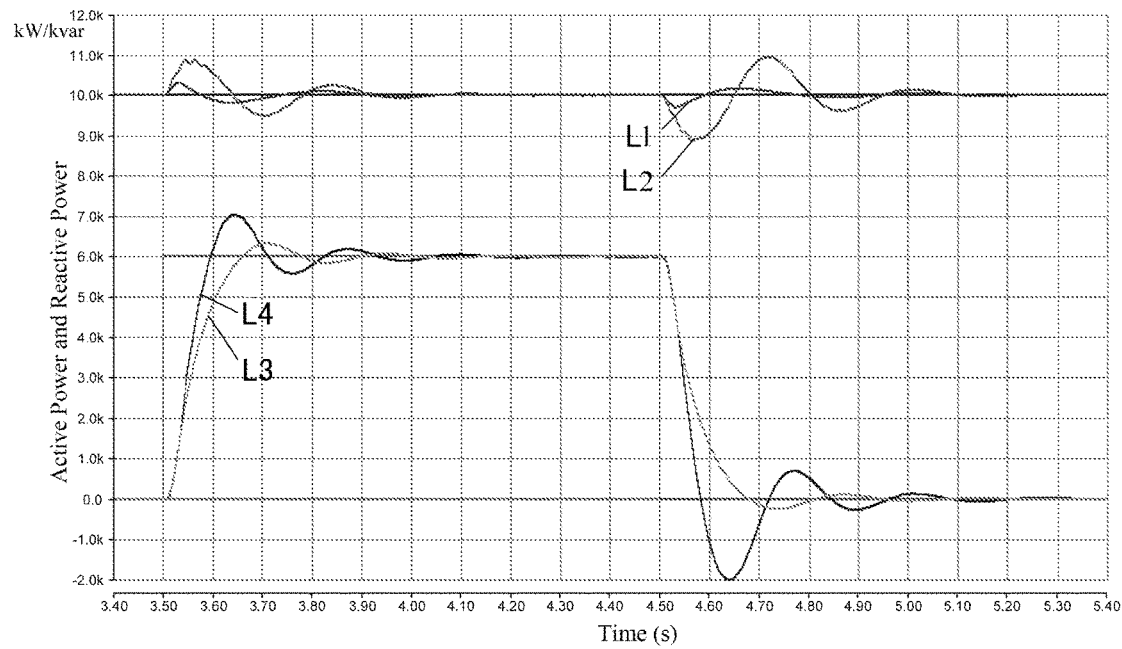
FIG. 9B shows a simulation waveform of the output active power when the instruction for the reactive power of the inverter changes according to one embodiment of the present invention.
Figure 10A:
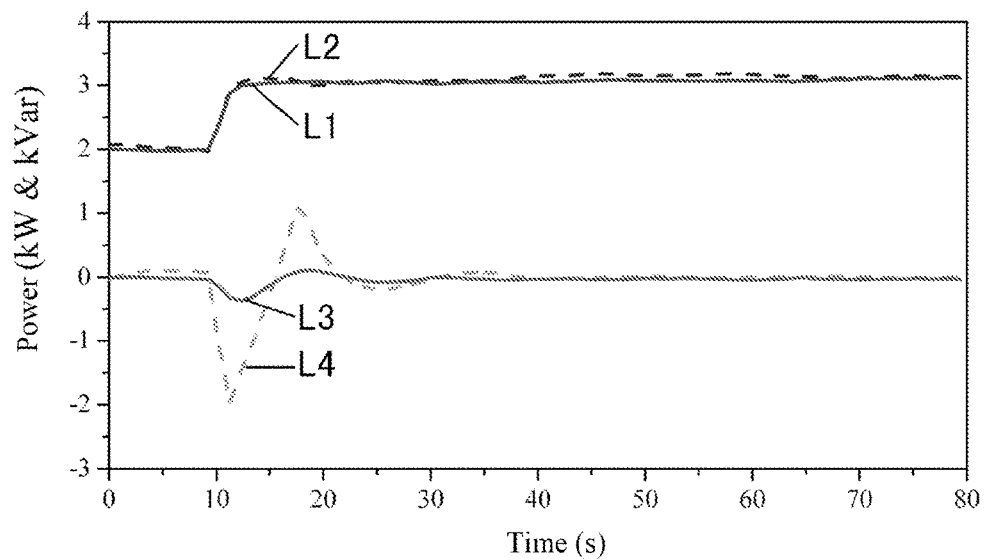
FIG. 10A shows an experimental waveform when the instruction for the active power of the inverter increases from 2 kW to 3 kW according to one embodiment of the present invention.
Figure 10B:
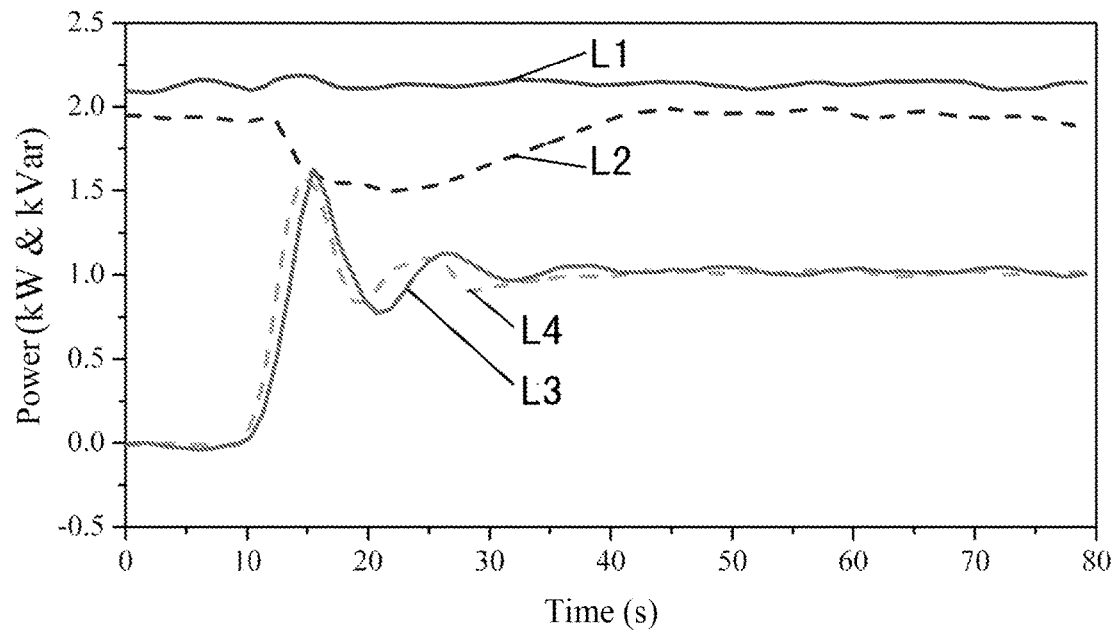
FIG. 10B shows an experimental waveform when the instruction for the reactive power of the inverter increases from 0 kvar to 1 kvar according to one embodiment of the present invention.

One embodiment of the present invention provides a technical solution for decoupling the output power of a grid-connected inverter, the principle of which is illustrated in FIGS. 2-8. The results of the comparison between an inverter using this method and an inverter using a conventional control method are shown in FIGS. 9 and 10. FIG. 9A and FIG. 10A show the cases when the instruction for the active power changes. It can be indicated that fluctuations of the reactive power can be effectively suppressed by using the technical solution according to embodiments of the present invention; and FIG. 9B and FIG. 10B show the cases when the instructions for the reactive power changes. It can be inferred that the fluctuations of the active power can be effectively suppressed by using the technical solution according to embodiments of the present invention.

Figure 1:
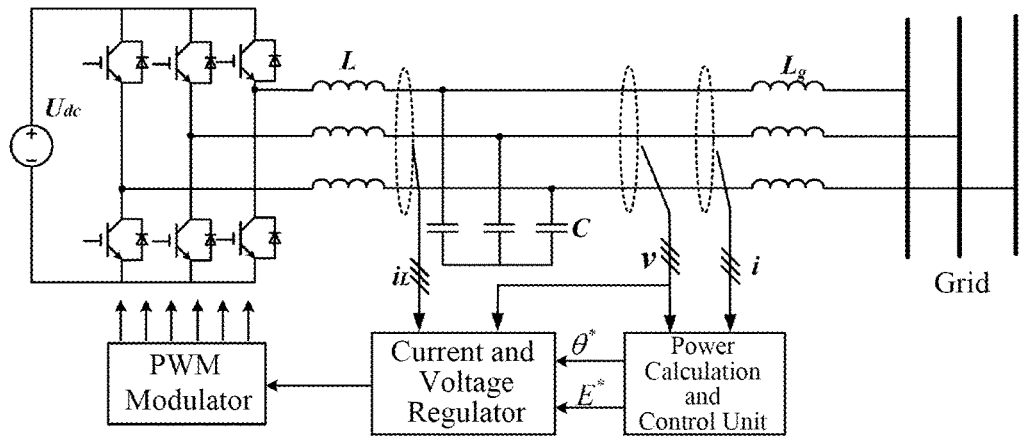
FIG. 1 illustrates a block diagram of a voltage-controlled grid-connected inverter in the prior art.
Figure 2:
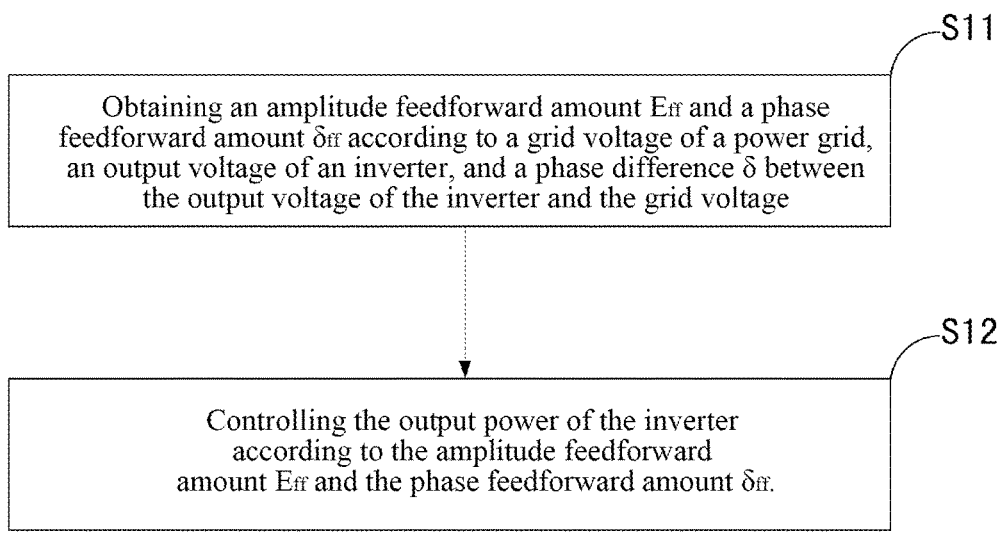
FIG. 2 is a flowchart of method for controlling an output power of an inverter according to one embodiment of the present invention.

Referring to FIG. 2, which is a flowchart of method for controlling an output power of an inverter according to one embodiment of the present invention, the inverter being electrically connected to a power grid. As shown in FIG. 2, the control method may comprise the following steps:

a feedforward amount acquisition step S11: obtaining an amplitude feedforward amount $E_{ff}$ and a phase feedforward amount $\delta_{ff}$, according to the grid voltage of the power grid, the output voltage of the inverter, and a phase difference $\delta$ between the output voltage of the inverter$_{[0]}$ and the grid voltage, for example, by using the following Equation:

$$E_{ff} = \sum \frac{UE\sin\delta}{U\cos\delta - 2E}\Delta\delta$$

$$\delta_{ff} = -\sum \frac{\tan\delta}{E}\Delta E,$$

wherein U is an amplitude of the grid voltage, E is an amplitude of the output voltage of the inverter, $\Delta E$ is a variation of the amplitude E of the output voltage of the inverter during two adjacent control periods, $\Delta\delta$ is a variation of the phase difference $\delta$ during two adjacent control periods; and a power regulation step S12: controlling the output power of the inverter according to the amplitude feedforward amount $E_{ff}$ and the phase feedforward amount $\delta_{ff}$.

Noted that the grid voltage and the output voltage of the inverter involved in the present invention may be line voltage or phase voltage, but the present invention is not limited thereto. The control period refers to a period of an inverter system at the corresponding control frequency, such as 1 kHz-200 kHz, but the present invention is not limited thereto.

Figure 3:
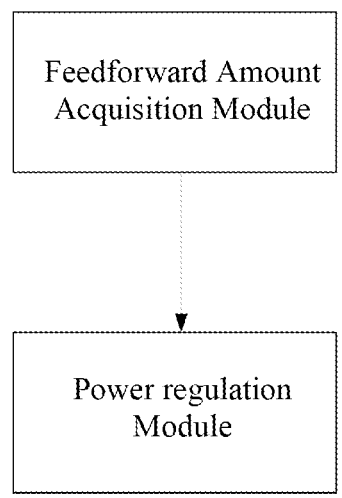
FIG. 3 is a schematic diagram of the structure of an apparatus for controlling an output power of an inverter according to one embodiment of the present invention.

Next, referring to FIG. 3, which is a schematic diagram of the structure of an apparatus for controlling an output power of an inverter according to one embodiment of the present invention, the inverter being electrically connected to a power grid, wherein the control apparatus may comprise a feedforward amount acquisition module and a power regulation module.

The feedforward amount acquisition module may obtain an amplitude feedforward amount $E_{ff}$ and a phase feedforward amount $\delta_{ff}$ according to a grid voltage of the power grid, an output voltage of the inverter, and a phase difference $\delta$ between the output voltage of the inverter$_{[0]}$ and the grid voltage, for example, by using the following Equation:

$$E_{ff} = \sum \frac{UE\sin\delta}{U\cos\delta - 2E}\Delta\delta$$

$$\delta_{ff} = -\sum \frac{\tan\delta}{E}\Delta E,$$

wherein U is an amplitude of the grid voltage, E is an amplitude of the output voltage of the inverter, $\Delta E$ is a variation of the amplitude E of the output voltage of the inverter during two adjacent control periods, and $\Delta\delta$ is a variation of the phase difference $\delta$ during two adjacent control periods.

The power regulation module may control the output power of the inverter according to the amplitude feedforward amount $E_{ff}$ and the phase feedforward amount $\delta_{ff}$.

Figure 4:
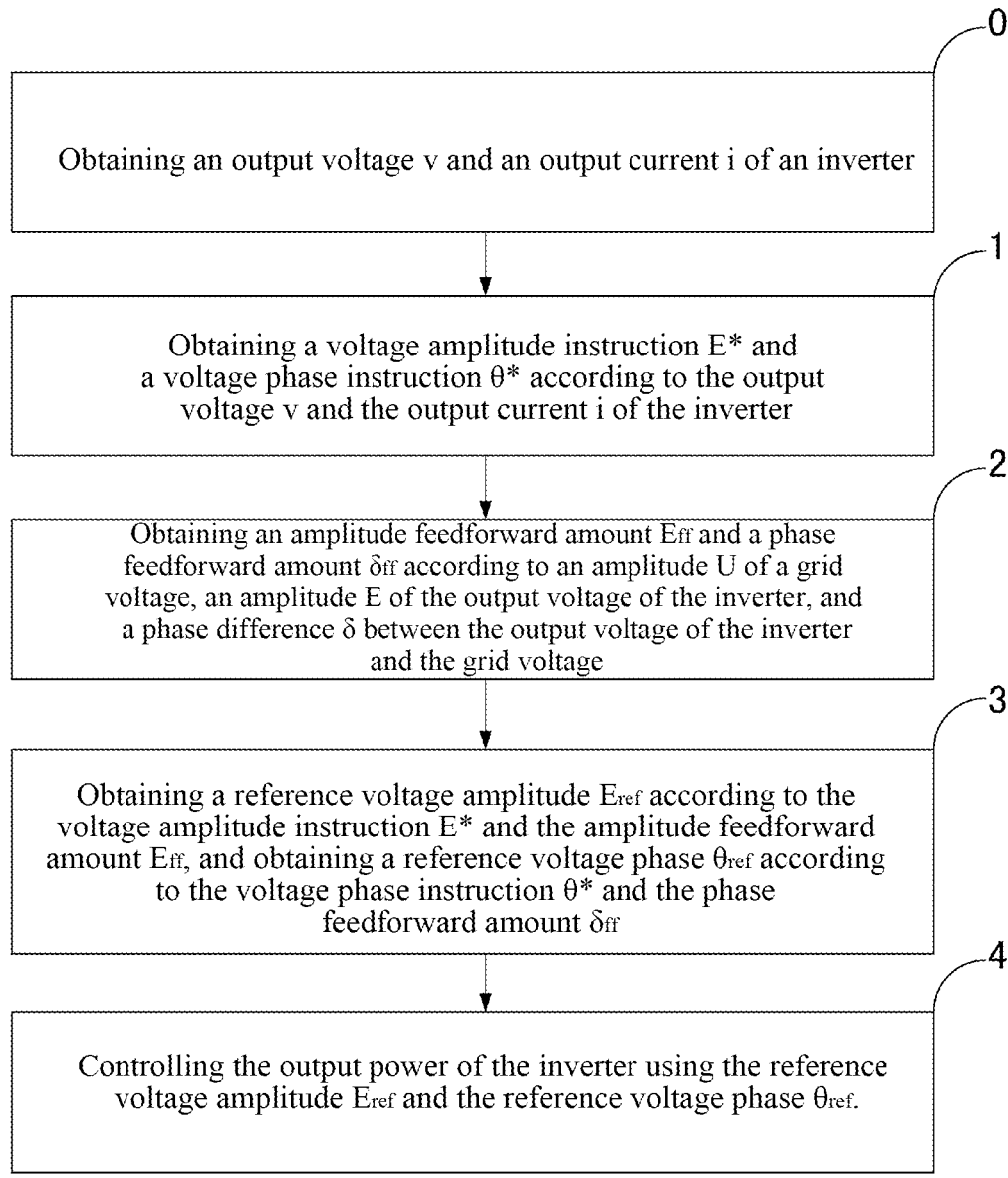
FIG. 4 is a flowchart of a method for decoupling an output power of an inverter according to one embodiment of the present invention.
Figure 5:
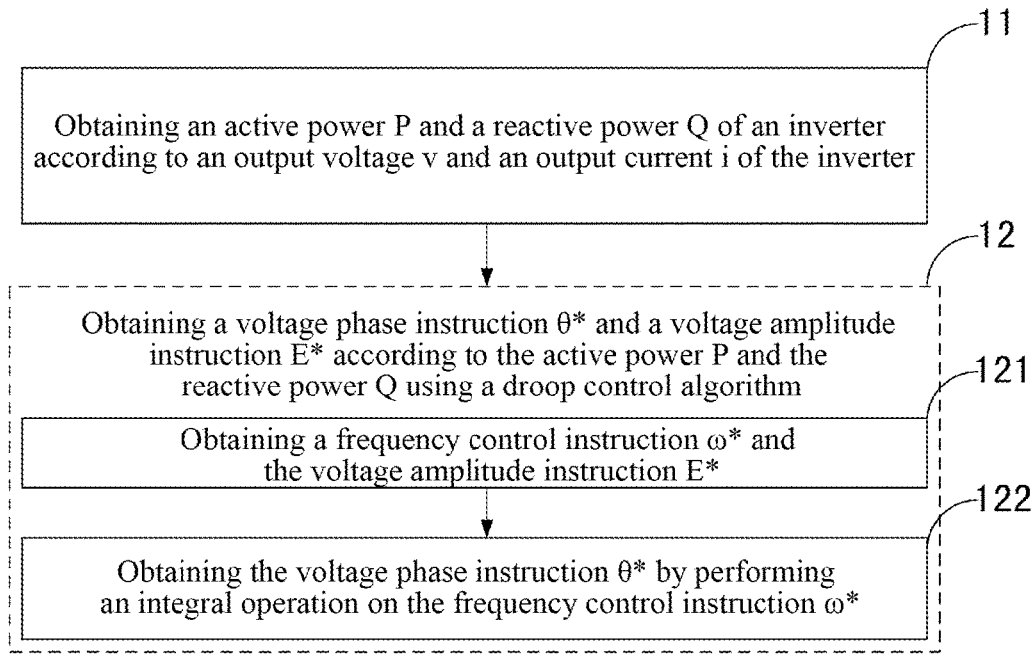
FIG. 5 is a flowchart of sub-steps of step 1 of a method for decoupling an output power of an inverter according to one embodiment of the present invention.
Figure 6:
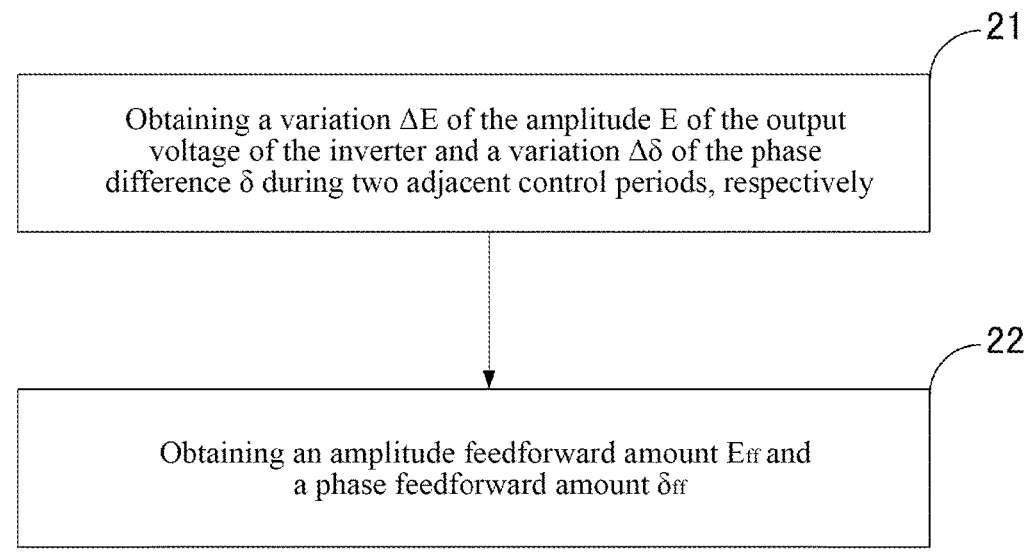
FIG. 6 is a flowchart of sub-steps of step 2 of a method for decoupling an output power of an inverter according to one embodiment of the present invention.
Figure 7:
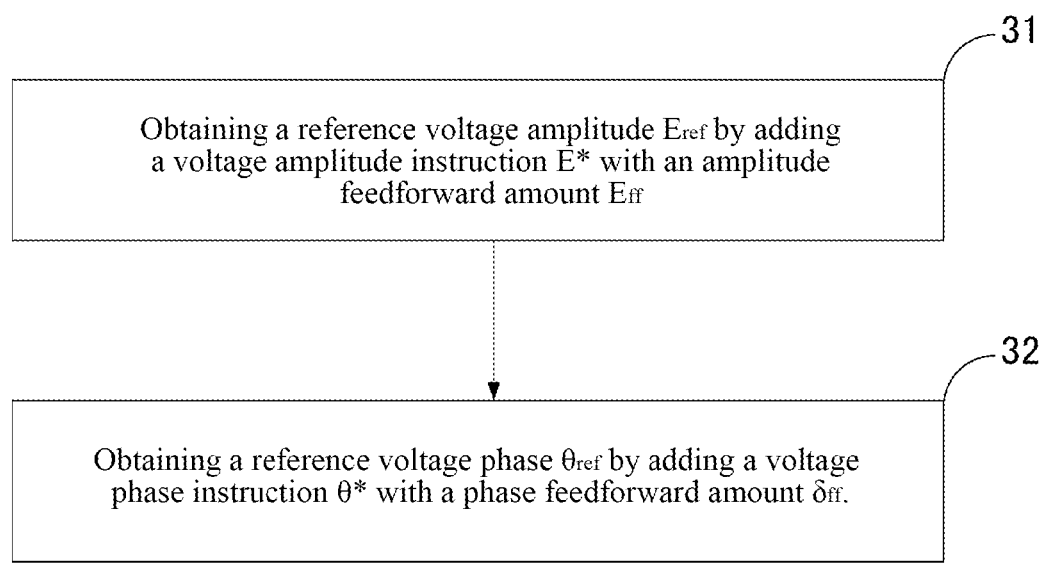
FIG. 7 is a flowchart of sub-steps of step 3 of a method for decoupling an output power of an inverter according to one embodiment of the present invention.

Referring to FIGS. 4-7. FIG. 4 is a flowchart of a method for decoupling an output power of an inverter according to one embodiment of the present invention, the inverter being electrically connected to a power grid; FIG. 5 is a flowchart of sub-steps of step 1 of a method for decoupling an output power of an inverter according to one embodiment of the present invention; FIG. 6 is a flowchart of sub-steps of step 2 of a method for decoupling an output power of an inverter according to one embodiment of the present invention; and FIG. 7 is a flowchart of sub-steps of step 3 of a method for decoupling an output power of an inverter according to one embodiment of the present invention.

The grid-connected inverter is of a voltage-controlled type, and the output terminal of the inverter is electrically connected to the power grid.

As shown in FIGS. 4-7, the power decoupling method may comprise the following steps:

step 0: obtaining an output voltage v and an output current i of the inverter, for example, by performing a sampling operation through a sampling circuit;

step 1: obtaining a voltage amplitude instruction E* and a voltage phase instruction θ* according to the output voltage v and the output current i of the inverter, wherein the amplitude E and the phase θ of the output voltage v can be obtained according to the output voltage v;

step 2: obtaining an amplitude feedforward amount $E_{ff}$ and a phase feedforward amount $\delta_{ff}$ according to an amplitude U of a grid voltage of the power grid, an amplitude E of the output voltage of the inverter, and a phase difference $\delta$ between the output voltage of the inverter$_{[0]}$ and the grid voltage;

step 3: obtaining a reference voltage amplitude $E_{ref}$ according to the voltage amplitude instruction E* and the amplitude feedforward amount $E_{ff}$, and obtaining a reference voltage phase $\theta_{ref}$ according to the voltage phase instruction θ* and the phase feedforward amount $\delta_{ff}$; and step 4: controlling the output power of the inverter using the reference voltage amplitude $E_{ref}$ and the reference voltage phase $\theta_{ref}$.

Further, step 1 may further comprise the following steps:

step 11: obtaining an active power P and a reactive power Q of the inverter according to the output voltage v and the output current i of the inverter, with the following Equation:

$$P=\sqrt{3}VI\cos\varphi;$$

$$Q=\sqrt{3}VI\sin\varphi;$$

wherein V is the effective value of the line voltage of output voltage, I is the effective value of the line current of output current, and $\varphi$ is a phase difference between the phase voltage of output voltage and phase current of output current.

step 12: obtaining the voltage phase instruction $\theta^*$ and the voltage amplitude instruction $E^*$ according to the active power P and the reactive power Q using a power control algorithm (such as a droop control algorithm).

Step 2 may further comprise the following steps:

step 21: obtaining a variation $\Delta E$ of the amplitude E of the output voltage of the inverter and a variation $\Delta\delta$ of the phase difference $\delta$ during two adjacent control periods, respectively, e.g., $\Delta E=E2-E1$ and $\Delta\delta=\delta2-\delta1$, wherein E2 represents the amplitude of the output voltage of the inverter that is acquired in the present control period; $\delta2$ represents the phase difference between the output voltage of the inverter and the grid voltage that are acquired in the present control period; E1 represents the amplitude of the output voltage of the inverter that is acquired in the previous control period; and $\delta1$ represents the phase difference between the output voltage of the inverter and the grid voltage that are acquired in the previous control period; and wherein, in one embodiment, for example, the output voltage of the inverter is a line voltage, but the present invention is not limited thereto; and step 22: obtaining the amplitude feedforward amount $E_{ff}$ and the phase feedforward amount $\delta_{ff}$ using the following Equation:

$$E_{ff} = \sum \frac{UE\sin\delta}{U\cos\delta - 2E}\Delta\delta$$

$$\delta_{ff} = -\sum \frac{\tan\delta}{E}\Delta E.$$

Step 3 may further comprise the following steps:

step 31: obtaining the reference voltage amplitude $E_{ref}$ by adding the voltage amplitude instruction $E^*$ with the amplitude feedforward amount $E_{ff}$, for example, using the following Equation:

$$E_{ref}=E^*+E_{ff}; \text{ and}$$

step 32: obtaining the reference voltage phase $\theta_{ref}$ by adding the voltage phase instruction $\theta^*$ with the phase feedforward amount $\delta_{ff}$, for example, using the following Equation:

$$\theta_{ref}=\theta^*+\delta_{ff};$$

wherein, in this embodiment, step 31 and step 32 may be performed sequentially, but the present invention is not limited thereto; in other embodiments, step 31 and step 32 may be performed simultaneously or in reverse sequence.

Further, step 12 may further comprise the following steps:

step 121: obtaining a frequency control instruction $\omega^*$ and the voltage amplitude instruction $E^*$, for example, according to the following Equation of the droop control algorithm:

$$\omega^*=\omega_0-k_p(P-P_{ref})$$

$$E^*=E_0-k_q(Q-Q_{ref})$$

wherein $P_{ref}$ and $Q_{ref}$ are instruction values for the active power P and the reactive power Q, respectively, and the instruction values may be the power dispatch instructions which are transferred from a higher-level controller (such as a system controller), or generated by the maximum power point tracking (MPPT) algorithm which is executed for the primary energy source, etc.; $\omega_0$ and $E_0$ are a Rated Frequency and a Rated Voltage Amplitude of the power grid, respectively, and $k_p$ and $k_q$ are droop coefficients for the active power P and the reactive power Q, respectively, and are both positive numbers; and step 122: obtaining the voltage phase instruction $\theta^*$ by performing an integral operation on the frequency control instruction $\omega^*$:

$$\theta^*=\int\omega^*dt.$$

Noted that this embodiment is described by using the droop control algorithm as an example of the power control algorithm, but the present invention is not limited thereto. In other embodiments, the frequency control instruction $\omega^*$ and the voltage amplitude instruction $E^*$ may be obtained by many other methods, such as a virtual synchronous generator control algorithm which may obtain the operating characteristics similar to those of a synchronous generator by controlling the inverter to simulate the operating principle of a synchronous generator.

Figure 8:
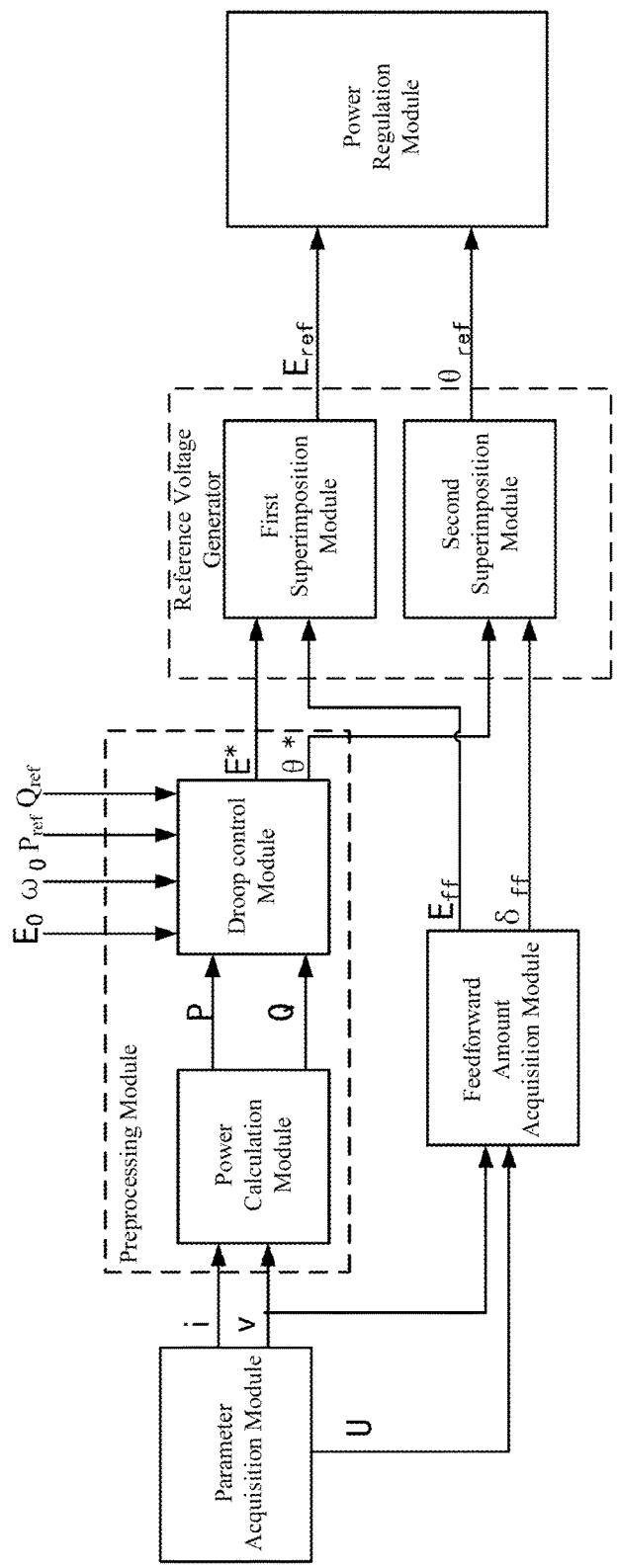
FIG. 8 is a schematic diagram of the structure of an apparatus for decoupling a power of an inverter according to one embodiment of the present invention.

Next, referring to FIG. 8, FIG. 8 is a schematic diagram of the structure of an apparatus for decoupling a power of an inverter according to one embodiment of the present invention. The inverter of the present invention is of a voltage-controlled type, and the inverter is electrically connected to the power grid.

As shown in FIG. 8, the power decoupling apparatus may comprise:

a parameter acquisition module, configured to obtain an output voltage v and an output current i of the inverter;

a preprocessing module, configured to obtain a voltage amplitude instruction $E^*$ and a voltage phase instruction $\theta^*$ according to the output voltage v and the output current i of the inverter;

a feedforward amount acquisition module, configured to obtain an amplitude feedforward amount $E_{ff}$ and a phase feedforward amount $\delta_{ff}$ according to an amplitude U of the grid voltage, an amplitude E of the output voltage of the inverter, and a phase difference $\delta$ between the output voltage of the inverter$_{[0]}$ and the grid voltage, for example, using the following Equation:

$$E_{ff} = \sum \frac{UE\sin\delta}{U\cos\delta - 2E}\Delta\delta,$$

$$\delta_{ff} = -\sum \frac{\tan\delta}{E}\Delta E;$$

a reference voltage generator, configured to obtain a reference voltage amplitude $E_{ref}$ according to the voltage amplitude instruction $E^*$ and the amplitude feedforward amount $E_{ff}$, for example, by a first superimposition module of the reference voltage generator, and to obtain a reference voltage phase $\theta_{ref}$ according to the voltage phase instruction $\theta^*$ and the phase feedforward amount $\delta_{ff}$, for example, by a second superimposition module of the reference voltage generator; and a power regulator, configured to control the output power of the inverter using the reference voltage amplitude $E_{ref}$ and the reference voltage phase $\theta_{ref}$. For example, the output power of the inverter may be adjusted by controlling the turning-on and/or turning-off of the respective switches according to the PWM signals which is generated according to a closed-loop control, but the present invention is not limited thereto.

Further, the preprocessing module may further comprise:

a power calculation module, configured to obtain an active power P and a reactive power Q of the inverter according to the output voltage v and the output current i of the inverter, using the following Equation:

$$P=\sqrt{3}VI\cos\varphi;$$

$$Q=\sqrt{3}VI\sin\varphi;$$

wherein V is the effective value of the line voltage of output voltage, I is the effective value of the line current of output current, and $\varphi$ is a phase difference between the phase voltage of output voltage and the phase current of output current.

a droop control module, configured to obtain the voltage phase instruction $\theta^*$ and the voltage amplitude instruction $E^*$ according to the active power P and the reactive power Q using a droop control algorithm.

Furthermore, the droop control module may be configured to obtain a frequency control instruction $\omega^*$ and the voltage amplitude instruction $E^*$, for example, according to the following Equation of droop control algorithm:

$$\omega^*=\omega_0-k_p(P-P_{ref})$$

$$E^*=E_0-k_q(Q-Q_{ref})$$

wherein $P_{ref}$ and $Q_{ref}$ are instruction values for the active power P and the reactive power Q, respectively, $\omega_0$ and $E_0$ are a Rated Frequency and a Rated Voltage Amplitude of the power grid, respectively, and $k_p$ and $k_q$ are droop coefficients for the active power P and the reactive power Q, respectively, and are both positive numbers.

Then, the droop control module may also be configured to obtain the voltage phase instruction $\theta^*$ by performing an integral operation on the frequency control instruction $\omega^*$, for example, using the following Equation:

$$\theta^*=\int\omega^*dt.$$

Noted that this embodiment is described by using the droop control algorithm as an example of the power control algorithm, but the present invention is not limited thereto. In other embodiments, the frequency control instruction $\omega^*$ and the voltage amplitude instruction $E^*$ can also be obtained by many other methods such as a virtual synchronous generator control algorithm.

Furthermore, the reference voltage generator may further comprise:

a first addition module, configured to obtain the reference voltage amplitude $E_{ref}$ by adding the voltage amplitude instruction $E^*$ with the amplitude feedforward amount $E_{ff}$, for example, using the following Equation:

$$E_{ref}=E^*+E_{ff};\text{ and}$$

a second addition module, configured to obtain the reference voltage phase $\theta_f$ by adding the voltage phase instruction $\theta^*$ with the phase feedforward amount $\delta_{ff}$, for example, using the following Equation:

$$\theta_{ref}=\theta^*+\delta_{ff}.$$

Next, referring to FIGS. 9A, 9B, 10A and 10B, FIG. 9A shows a simulation waveform of the output reactive power when the instruction for the active power of the inverter changes according to one embodiment of the present invention; FIG. 9B shows a simulation waveform of the output active power when the instruction for the reactive power of the inverter changes according to one embodiment of the present invention; FIG. 10A shows an experimental waveform when the instruction for the active power of the inverter increases from 2 kW to 3 kW according to one embodiment of the present invention; and FIG. 10B shows an experimental waveform when the instruction for the reactive power of the inverter increases from 0 kvar to 1 kvar according to one embodiment of the present invention.

As shown in FIGS. 9A and 9B, curve L1 denotes a waveform of the output active power with the decoupling control method; curve L2 denotes a waveform of the output active power without the decoupling control method; curve L3 denotes a waveform of the output reactive power with the decoupling control method; and curve L4 denotes a waveform of the output reactive power without the decoupling control method. In the beginning, the inverter supplies active power of 10 kW to the power grid, with no output reactive power. The instruction value for the active power decreases from 10 kW to 5 kW at 1.5 s, and then restores to 10 kW at 2.5 s. From FIG. 9A, it can be found that fluctuations of reactive power during this period can be effectively suppressed by using the solution of the present invention. The instruction value for the reactive power increases from 0 kvar to 6 kvar at 3.5 s, and then restores to 0 kvar at 4.5 s. From FIG. 9B, it can be found that fluctuations of active power during this period can be effectively suppressed by using the solution of the present invention.

As shown in FIGS. 10A and 10B, curve L1 denotes a waveform of the output active power with the decoupling control method; curve L2 denotes a waveform of the output active power without the decoupling control method; curve L3 denotes a waveform of the output reactive power with the decoupling control method; and curve L4 denotes a waveform of the output reactive power without the decoupling control method. FIG. 10A verifies the variation of the reactive power when the instruction value for the active power increases from 2 kW to 3 kW, and it can be seen that fluctuations of the reactive power after decoupling are obviously smaller than those before decoupling; FIG. 10B verifies the variation of the active power when the instruction value for the reactive power changes from 0 kvar to 1 kvar, and the result shows that fluctuations of the active power after decoupling are obviously smaller than those before decoupling. The experimental results prove the effectiveness of the power decoupling solution according to embodiments of the present invention.

It should be noted that the above embodiments are used only to illustrate the present invention but not to limit the technical solution described in the present invention; meanwhile, although the present invention has been disclosed in detail with reference to the above embodiments in the present description, those of ordinary skills in the art should appreciate that they still can make amendments or equivalent substitutions to the present invention; therefore, all technical solutions not departing from the spirit and scope of the present invention and the improvements thereof should all fall within the scopes of protection of the appended claims of the present invention.

What is claimed is:
1. A method for controlling an output power of an inverter, the inverter being electrically connected to a power grid, wherein the control method comprises the following steps:
obtaining an amplitude feedforward amount $E_{ff}$ and a phase feedforward amount $\delta_{ff}$ according to a grid voltage of the power grid, an output voltage of the inverter, and a phase difference $\delta$ between the output voltage of the inverter$_{[0]}$ and the grid voltage, using the following Equation:

$$E_{ff} = \sum \frac{UE\sin\delta}{U\cos\delta - 2E}\Delta\delta$$
$$\delta_{ff} = -\sum \frac{\tan\delta}{E}\Delta E,$$

wherein U is an amplitude of the grid voltage, E is an amplitude of the output voltage of the inverter, $\Delta E$ is a variation of the amplitude E of the output voltage of the inverter during two adjacent control periods, $\Delta\delta$ is a variation of the phase difference $\delta$ during two adjacent control periods; and
controlling the output power of the inverter according to the amplitude feedforward amount $E_{ff}$ and the phase feedforward amount $\delta_{ff}$.

2. An apparatus for controlling an output power of an inverter, the inverter being electrically connected to a power grid, wherein the apparatus comprises:
a feedforward amount acquisition module, configured to obtain an amplitude feedforward amount $E_{ff}$ and a phase feedforward amount $\delta_{ff}$ according to a grid voltage of the power grid, an output voltage of the inverter, and a phase difference $\delta$ between the output voltage of the inverter$_{[0]}$ and the grid voltage, using the following Equation:

$$E_{ff} = \sum \frac{UE\sin\delta}{U\cos\delta - 2E}\Delta\delta$$
$$\delta_{ff} = -\sum \frac{\tan\delta}{E}\Delta E,$$

wherein U is an amplitude of the grid voltage, E is an amplitude of the output voltage of the inverter, $\Delta E$ is a variation of the amplitude E of the output voltage of the inverter during two adjacent control periods, and $\Delta\delta$ is a variation of the phase difference $\delta$ during two adjacent control periods; and
a power regulation module, configured to control the output power of the inverter according to the amplitude feedforward amount $E_{ff}$ and the phase feedforward amount $\delta_{ff}$.

3. A method for decoupling an output power of an inverter, the inverter being electrically connected to a power grid, wherein the method comprises the following steps:
step 1: obtaining a voltage amplitude instruction E* and a voltage phase instruction $\theta$* according to an output voltage and an output current of the inverter;
step 2: obtaining an amplitude feedforward amount $E_{ff}$ and a phase feedforward amount $\delta_{ff}$ according to an amplitude U of a grid voltage of the power grid, an amplitude E of the output voltage of the inverter, and a phase difference $\delta$ between the output voltage of the inverter$_{[0]}$ and the grid voltage;

step 3: obtaining a reference voltage amplitude $E_{ref}$ according to the voltage amplitude instruction E* and the amplitude feedforward amount $E_{ff}$, and obtaining a reference voltage phase $\theta_{ref}$ according to the voltage phase instruction $\theta$* and the phase feedforward amount $\delta_{ff}$; and
step 4: regulating the output power of the inverter using the reference voltage amplitude $E_{ref}$ and the reference voltage phase $\theta_{ref}$.

4. The method according to claim 3, wherein said step 1 comprises the following steps:
step 11: obtaining an active power P and a reactive power Q of the inverter according to the output voltage and the output current of the inverter; and
step 12: obtaining the voltage phase instruction $\theta$* and the voltage amplitude instruction E* according to the active power P and the reactive power Q using a droop control algorithm.

5. The method according to claim 4, wherein said step 12 comprises the following steps:
step 121: obtaining a frequency control instruction $\omega$* and the voltage amplitude instruction E* according to the following Equation of the droop control algorithm:

$$\omega^* = \omega_0 - k_p(P - P_{ref})$$

$$E^* = E_0 - k_q(Q - Q_{ref})$$

wherein $P_{ref}$ and $Q_{ref}$ are instruction values for the active power P and the reactive power Q, respectively, $\omega_0$ and $E_0$ are a Rated Frequency and a Rated Voltage Amplitude of the power grid, respectively, and $k_p$ and $k_q$ are droop coefficients for the active power P and the reactive power Q, respectively, and are both positive numbers; and
step 122: obtaining the voltage phase instruction $\theta$* by performing an integral operation on the frequency control instruction $\omega$*.

6. The method according to claim 3, wherein said step 2 comprises the following steps:
step 21: obtaining a variation $\Delta E$ of the amplitude E of the output voltage of the inverter and a variation $\Delta\delta$ of the phase difference $\delta$ during two adjacent control periods, respectively; and
step 22: obtaining the amplitude feedforward amount $E_{ff}$ and the phase feedforward amount $\delta_{ff}$ using the following Equation:

$$E_{ff} = \sum \frac{UE\sin\delta}{U\cos\delta - 2E}\Delta\delta$$
$$\delta_{ff} = -\sum \frac{\tan\delta}{E}\Delta E.$$

7. The method according to claim 3, wherein said step 3 comprises the following steps:
step 31: obtaining the reference voltage amplitude $E_{ref}$ by adding the voltage amplitude instruction E* with the amplitude feedforward amount $E_{ff}$; and
step 32: obtaining the reference voltage phase $\theta_{ref}$ by adding the voltage phase instruction $\theta$* with the phase feedforward amount $\delta_{ff}$.

8. The method according to claim 3, wherein before said step 1, said method further comprises a step 0 for obtaining the output voltage and the output current of the inverter.

9. The method according to claim 3, wherein the inverter is of a voltage-controlled type.

10. An apparatus for decoupling a power of an inverter, the inverter being electrically connected to a power grid, wherein the apparatus comprises:
- a preprocessing module, configured to obtain a voltage amplitude instruction E* and a voltage phase instruction θ* according to an output voltage and an output current of the inverter;
- a feedforward amount acquisition module, configured to obtain an amplitude feedforward amount $E_{ff}$ and a phase feedforward amount $\delta_{ff}$ according to an amplitude U of the grid voltage, an amplitude E of the output voltage of the inverter, and a phase difference δ between the output voltage of the inverter[o] and the grid voltage;
- a reference voltage generator, configured to obtain a reference voltage amplitude $E_{ref}$ according to the voltage amplitude instruction E* and the amplitude feedforward amount $E_{ff}$, and to obtain a reference voltage phase $\theta_{ref}$ according to the voltage phase instruction θ* and the phase feedforward amount $\delta_{ff}$; and
- a power regulator, configured to control the output power of the inverter using the reference voltage amplitude $E_{ref}$ and the reference voltage phase $\theta_{ref}$.

11. The apparatus according to claim 10, wherein the preprocessing module comprises:
- a power calculation module, configured to obtain an active power P and a reactive power Q of the inverter according to the output voltage and the output current of the inverter; and
- a droop control module, configured to obtain the voltage phase instruction θ* and the voltage amplitude instruction E* according to the active power P and the reactive power Q using a droop control algorithm.

12. The apparatus according to claim 11, wherein the droop control module is configured to obtain a frequency control instruction ω* and the voltage amplitude instruction E* according to the following Equation of the droop control algorithm:

$$\omega^* = \omega_0 - k_p(P - P_{ref})$$

$$E^* = E_0 - k_q(Q - Q_{ref})$$

wherein $P_{ref}$ and $Q_{ref}$ are instruction values for the active power P and the reactive power Q, respectively, $\omega_0$ and $E_0$ are a Rated Frequency and a Rated Voltage Amplitude of the power grid, respectively, and $k_p$ and $k_q$ are droop coefficients for the active power P and the reactive power Q, respectively, and are both positive numbers; and to obtain the voltage phase instruction θ* by performing an integral operation on the frequency control instruction ω*.

13. The apparatus according to claim 10, wherein the feedforward amount acquisition module obtains a variation ΔE of the amplitude E of the output voltage of the inverter and a variation Δδ of the phase difference δ during two adjacent control periods, respectively, and obtains the amplitude feedforward amount $E_{ff}$ and the phase feedforward amount $\delta_{ff}$ using the following Equation:

$$E_{ff} = \sum \frac{UE\sin\delta}{U\cos\delta - 2E}\Delta\delta$$

$$\delta_{ff} = -\sum \frac{\tan\delta}{E}\Delta E.$$

14. The apparatus according to claim 10, wherein the reference voltage generator further comprises:
- a first addition module, configured to obtain the reference voltage amplitude $E_{ref}$ by adding the voltage amplitude instruction E* with the amplitude feedforward amount $E_{ff}$; and
- a second addition module, configured to obtain the reference voltage phase $\theta_{ref}$ by adding the voltage phase instruction θ* with the phase feedforward amount $\delta_{ff}$.

15. The apparatus according to claim 10, further comprising a parameter acquisition module for obtaining the output voltage and the output current of the inverter.

16. The apparatus according to claim 10, wherein the inverter is of a voltage-controlled type.

* * * * *